United States Patent [19]
Mattson et al.

[11] Patent Number: 5,384,861
[45] Date of Patent: Jan. 24, 1995

[54] MULTI-PARAMETER IMAGE DISPLAY WITH REAL TIME INTERPOLATION

[75] Inventors: Rodney A. Mattson, Mentor; Todd J. Krochta, Copley; Dominic J. Heuscher, Aurora, all of Ohio

[73] Assignee: Picker International, Inc., Highland Heights, Ohio

[21] Appl. No.: 719,827

[22] Filed: Jun. 24, 1991

[51] Int. Cl.6 ............................ G06F 15/00
[52] U.S. Cl. .................... 382/6; 364/413.13; 364/413.17
[58] Field of Search ............ 382/6; 378/63, 92, 156; 364/413.13, 413.14, 413.15, 413.18, 413.17; 340/706, 709, 728; 358/182; 250/901

[56] References Cited

U.S. PATENT DOCUMENTS

| | | | |
|---|---|---|---|
| 3,974,386 | 8/1975 | Mistretta et al. | 250/402 |
| 4,559,557 | 12/1985 | Keyes et al. | 364/413.23 |
| 4,698,626 | 10/1987 | Sato et al. | 340/706 |
| 4,742,558 | 5/1988 | Ishibashi et al. | 382/56 |
| 4,830,012 | 5/1989 | Riederer | 364/413.13 |
| 5,022,066 | 6/1991 | Haaker et al. | 364/413.15 |
| 5,034,988 | 7/1991 | Fujiwara | 382/6 |
| 5,056,524 | 10/1991 | Oe | 364/413.23 |

FOREIGN PATENT DOCUMENTS

112582A1  7/1984  European Pat. Off.
2530315   1/1976  Germany.

OTHER PUBLICATIONS

"Three-beam K-edge Imaging of Iodine Using Differences Between Fluoroscopic Video Images: Experimental Results", Riederer, et al., Med. Phys. 8(4) Jul.-/Aug. 1981 pp. 480-487.

*Primary Examiner*—Leo H. Boudreau
*Assistant Examiner*—Chris Kelley
*Attorney, Agent, or Firm*—Fay, Sharpe, Beall, Fagan, Minnich & McKee

[57] ABSTRACT

A source (A) of images, such as a CT scanner (10), a magnetic resonance imaging apparatus (12), and the like produces a plurality of basis images ($I_0$, $I_1$, $I_2$, $I_3$ ... ). Two of the basis images are subtracted and divided (70, 72) by a number of interpolation increments ($L_1$) to form a first differential image ($I_{\Delta 1}$). The first and the third basis images are subtracted and divided (76, 78) by a number of available interpolation increments ($L_2$) to form a second differential image ($I_{\Delta 2}$). Four differential images are selectively combined and divided by a product of the first and second available increments (82, 84) to form a second order differential image ($I^2_{\Delta 12}$). An array of adders (D) selectively adds the first differential image to a currently displayed image stored in an image memory E each time a track ball (104) moves a cursor one increment in a horizontal position. Each time the track ball moves the cursor one increment up or down along the vertical column, the adder array adds or subtracts the second differential image to the currently displayed image. Each time the track ball steps the cursor between rows or between columns, the second order differential image is used to correct one of the first and second differential images. In this manner, only the currently displayed image, the first differential image, the second differential image, and the second order differential image need be stored to provide free interpolation among four basis images. The basis images themselves need not be stored.

13 Claims, 3 Drawing Sheets

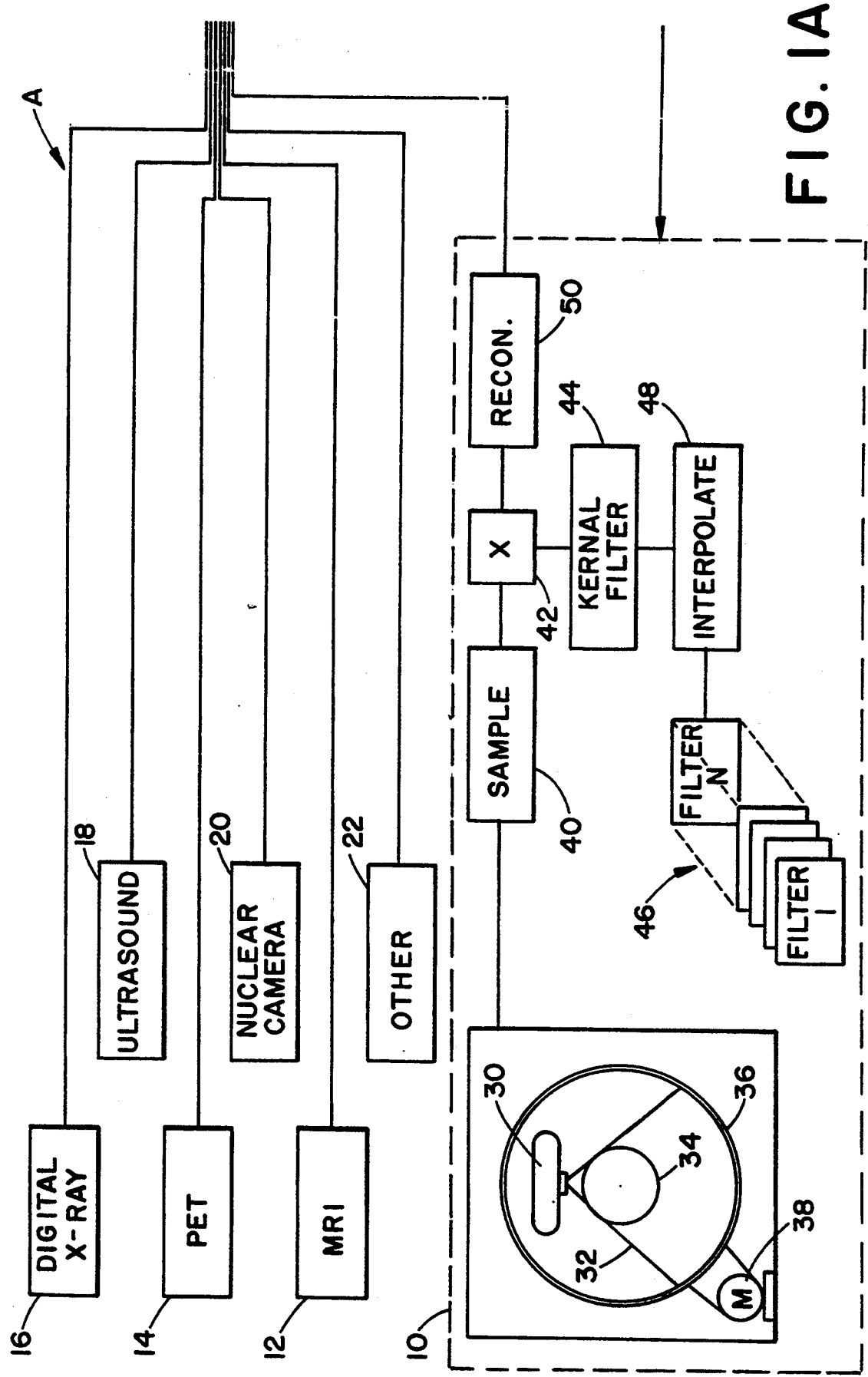

MULTI-PARAMETER IMAGE DISPLAY WITH REAL TIME INTERPOLATION

BACKGROUND OF THE INVENTION

The present invention pertains to the art of image manipulation and averaging. It finds particular application in conjunction with the blending of medical diagnostic images with different properties from CT scanners and other diagnostic imagers and will be described with particular reference thereto. However, it is to be appreciated, that the invention will also find application in conjunction with the combining of images from other sources and for other purposes such as TV or video images, satellite reconnaissance images, astronomical images, and others.

Heretofore, the data from CT scanners has been filtered with different filter or transfer functions and reconstructed into an image representation. Some filter functions increases smoothness of the data. Others emphasize edge or boundaries. Yet other filter functions provide high resolution. Various other filter functions provide other known enhancements. However, with some types of medical studies, sharp edge contrasts are important, with others resolution, with others smoothness, and with yet others various combinations of these and other image properties. Commonly, a filter or transfer function that is appropriate to the type of diagnosis to be made is selected in advance. This advance selection of the filter or transfer function provides no opportunity to adjust the edge enhancement, smoothness, and other image properties of the viewed image to optimize its diagnostic value.

Various other types of medical diagnostic imaging are in common usage, such as digital x-ray, magnetic resonance imaging, positron emission tomography, and the like. Each of these and other imaging modalities produces images with different qualities or characteristics. Some distinguish better among soft tissue, others image bone more clearly, yet others are ideally suited to imaging blood flow and the circulation system, and the like. In most instances, a single modality is selected in accordance with the type of diagnosis to be performed. Sometimes images from a plurality of modalities contain important but different diagnostic information.

In accordance with the present invention, there is provided a new and improved method and apparatus for enabling the viewer to optimize the image characteristics after the data is collected, reconstructed, and displayed.

SUMMARY OF THE INVENTION

In accordance with a one-dimensional embodiment of the present invention, two images are generated. The two images may be two images of the same region of the patient with different characteristics, two images of the same region from different imaging modalities, images of adjacent regions or slices from the same modality, or the like. The two images are subtracted and divided by a number of adjustment steps to be permitted between the two images. The difference image is stored and one of the other images is initially saved as a currently displayed image. As an operator moves a cursor to adjust an interpolation between the two images, the difference image is repeatedly added to or subtracted from the currently displayed image. In this manner, only two images are retained in memory—the currently displayed image and the difference image.

In accordance with a two-dimensional aspect of the present invention, four images are generated. Conceptually, the images can be thought of as being located at the four-corners of a rectangular interpolation grid. A first difference image is obtained by subtracting two adjacent images and dividing by the number of adjustment steps to be permitted therebetween. A second difference image is produced by subtracting one of the same images and an adjacent image and dividing by the number of permitted adjustment steps in that direction. A double difference image is generated by subtracting the sum of two opposite corner images and from the sum of the other two opposite corner images and dividing by the product of the number of adjustments in the first and second directions. The common image between the first and second difference images is retained initially as the currently displayed image. As the operator adjusts the interpolation among the images, the first, second, and double difference images are selectively added to and subtracted from the currently displayed image.

Analogously, an interpolation can be made among a larger number of images using difference, double difference, triple difference, etc., images.

One advantage of the present invention is that the weighting or interpolation among images is adjustable by the viewer in real time.

Another advantage of the present invention is that it enables a plurality of slices of data to be viewed as a continuum.

Another advantage of the present invention is that interpolation in multiple dimensions requires minimum memory.

Another advantage of the present invention is that it enables radiologists to optimize filter or transfer functions after the images are generated. Conversely, optimal filter or transfer functions preferred by radiologists for each type of study can be correlated.

Still further advantages of the present invention will become apparent to those of ordinary skill in the art upon reading and understanding the preceding detailed description.

BRIEF DESCRIPTION OF THE DRAWINGS

The invention may take form in various steps and arrangements of steps. The drawings are only for purposes of illustrating a preferred embodiment and are not to be construed as limiting the invention.

FIGS. 1A and 1B taken together are a diagrammatic illustration of a diagnostic imaging system in accordance with the present invention;

DETAILED DESCRIPTION OF THE PREFERRED EMBODIMENTS

Basis images from a plurality of image sources A are received and processed by an image subtracting and manipulating means B to generate first and higher order difference images which are stored in a differential image memory array C. An array of adder and subtractor means D concurrently adds or subtracts the pixel value of a selected differential image with the corresponding pixel values of a currently displayed image in a current image memory means E. An operator at an operator control console F views the currently displayed image and selectively adjusts the interpolation among the basis images. More specifically, as the operator adjusts the interpolation, the adder/subtractor array D adds or subtracts the appropriate, corresponding differential images.

Figure 2:
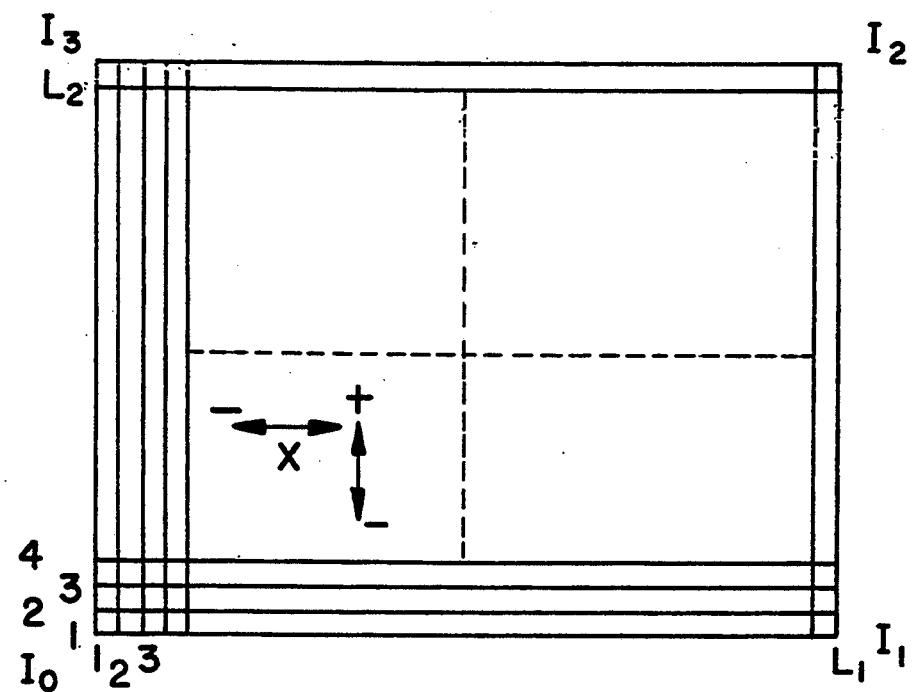
FIG. 2 is a diagrammatic illustration of a preferred operator display illustrating the preferred interpolation.

With reference to FIG. 2, a display of the selectable relative weighting of the images is either superimposed on the displayed diagnostic image or provided in a separate display. To interpolate between two images $I_0$ and $I_1$, the operator moves a cursor to one of $L_1$ positions along the line between $I_0$ and $I_1$. At the initial position, the image $I_0$ is displayed; and at the $L_1$th position, the image $I_1$ is displayed. At an intermediate position, e.g., the fourth step, the image would be:

$$\left(\frac{4}{L_1}\right)I_1 + \frac{(L_1 - 4)}{L_1}I_0$$

Averaging two completed images with this weighting could be relatively computational intensive and slow. By distinction with the present invention, as the operator moves the cursor from $I_0$ toward $I_1$, the displayed image continually changes, substantially in real time such that the operator can watch the image change and zero in on the weighting which the operator prefers. It is also contemplated that the operator can continue extrapolation beyond $I_0$ or $I_1$, by continuing to add (or subtract) the differential image.

More specifically, in this first order example, a first differential image $I_{\Delta 1}$ is determined. The first order differential image is the difference between $I_0$ and $I_1$ divided by the number of intermediate interpolation steps $L_1$, i.e.:

$$I_{\Delta 1} = (I_0 - I_1)/L_1 \qquad (1)$$

Initially, the image $I_0$ is loaded into the currently displayed image memory E. Each time the operator moves the cursor one step to the right, the adder/subtractor array D adds the value of each pixel of the first differential image to the corresponding pixel value of the image in the currently displayed image memory E. Each time the cursor is moved one step to the left, the adder/subtractor array subtracts this pixel value. (Should an array of adders or subtractors be commensurate with the number of pixel values in each image, the image in the currently displayed image memory can be updated in the time required for a single addition or subtraction operation). However, even if a single adder performs the operations in pipelined fashion, this would enables the currently displayed image to change substantially in real time with movement of the cursor.

Looking to a second order example, four images $I_0$, $I_1$, $I_2$, and $I_3$ are obtained. The first difference image $I_{\Delta 1}$, is again $(I_0 - I_1)/L_1$. Analogously, a second difference image in the vertical direction $I_{\Delta 2}$ is equal to the difference between the first and third images divided by the number of intermediate selectable interpolation steps $L_2$, i.e.:

$$I_{\Delta 2} = (I_0 - I_3)/L_2 \qquad (2)$$

It will be noted, however, that the change in the currently displayed image would not usually be the same for each step along the path between $I_0$ and $I_3$ as for each step along the path between $I_1$ and $I_2$, or other intermediate vertical paths. Rather, an adjustment is made in accordance with a differential image calculated based on images $I_0$ and $I_3$ and the differential image calculated based on images $I_1$ and $I_2$ and the number of steps $L_1$ between $I_0$ and $I_1$. That is, this second order differential image error per vertical column $I_{\Delta 2}{}^2$ is defined by:

$$I_{\Delta 2}^2 = \left[\frac{(I_0 - I_3)}{L_2} - \frac{(I_1 - I_2)}{L_2}\right]/L_1 = \frac{I_0 + I_2 - I_1 - I_3}{L_1 L_2}. \qquad (3)$$

Analogously, the second order differential image error $I^{\Delta 12}$ from row to row in the vertical direction is based on the difference between the differential images between $I_0$ and $I_1$ and the differential images between $I_3$ and $I_2$ and the number $L_2$ of horizontal rows i.e.:

$$I_{\Delta 1}^2 = \qquad (4)$$

$$\left[\frac{I_0 - I_1}{L_1} - \frac{I_3 - I_2}{L_1}\right]/L_2 = \frac{I_0 + I_2 - I_1 - I_3}{L_1 L_2} = I_{\Delta 2}^2.$$

Thus, the second order of correction $I_{\Delta 12}{}^2$ is the same in both directions.

In use, each time the operator moves the cursor horizontally to the right, the adder/subtractor array means D adds the first differential image to the image in the currently displayed image memory E and the second order differential image $I^2{}_{\Delta 12}$ to the second first order differential image $I_{\Delta 2}$. Each time the cursor is stepped vertically upward (downward), the adder array D adds (subtracts) the second differential image $I_{\Delta 2}$ to the image in the currently displayed image array E and the second order differential $I_{\Delta 12}{}^2$ to the first, first order differential image $I_{\Delta 1}$. If the cursor is now moved left or right, the adder array D adds or subtracts the second order corrected, first differential image for each horizontal step of movement. Of course, the second order differential image correction can be made instead to the second first order differential image $I_{\Delta 2}$ with each step $L_1$.

Figure 3:
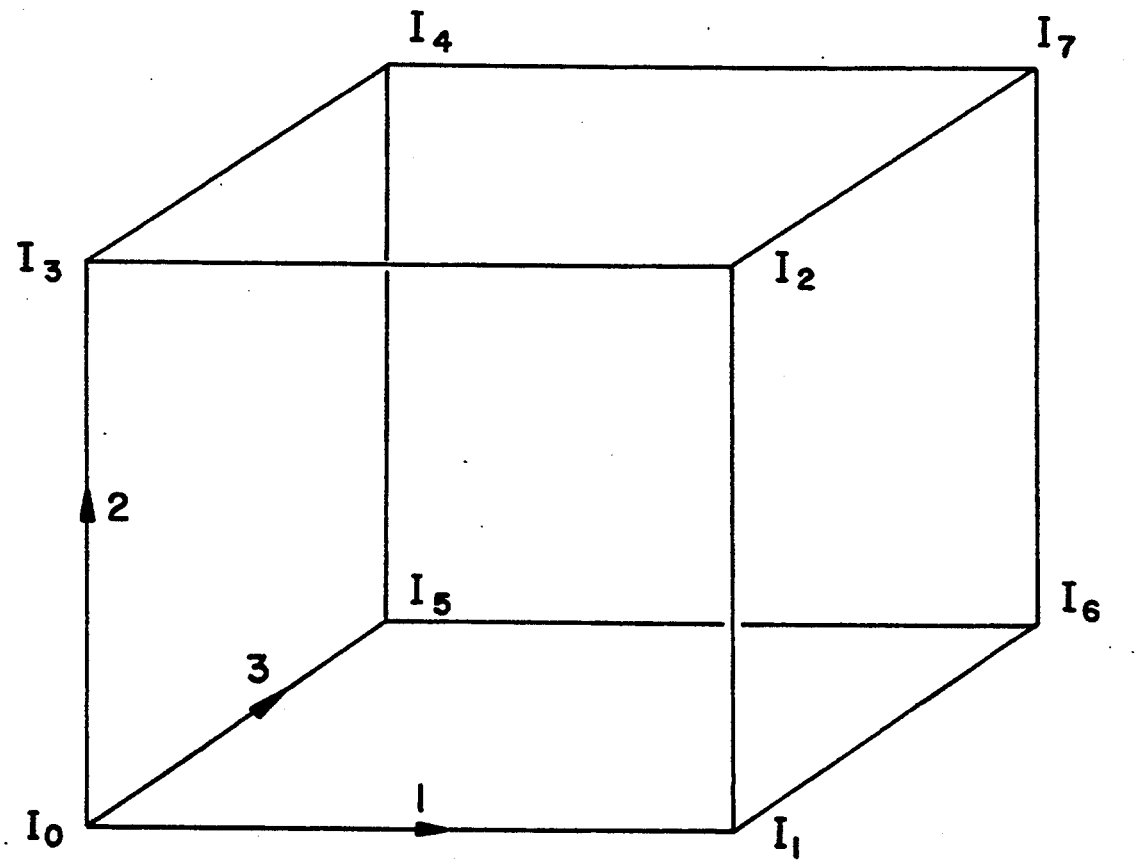
FIG. 3 is a diagrammatic illustration to assist in conceptualizing a third order embodiment of the present invention.

With reference to FIG. 3, a third order interpolation can be performed among eight images $I_0$, $I_1$, $I_2$, $I_3$, $I_4$, $I_5$, $I_6$, and $I_7$. Three first order differential images $I_{\Delta 1}$, $I_{\Delta 2}$, $I_{\Delta 3}$ are defined, one along each of the three axis, i.e.:

$$I_{\Delta 1} = (I_0 - I_1)/L_1 \qquad (5a)$$

$$I_{\Delta 2} = (I_0 - I_3)/L_2 \qquad (5b)$$

$$I_{\Delta 3} = (I_0 - I_5)/L_3 \qquad (5c)$$

where $L_3$ is the number of available intermediate interpolation steps in the direction between image $I_0$ and image $I_5$. Similarly, three second order differential images $I^2{}_{\Delta 12}$, $I^2{}_{\Delta 13}$ and $I^2{}_{\Delta 23}$ are fine along each of the three planes through $I_0$ and along the three axis 1, 2, 3, i.e.:

$$I_{\Delta 12}^2 = \frac{I_0 - I_1 + I_2 - I_3}{L_1 L_2} \qquad (6a)$$

$$I_{\Delta 13}^2 = \frac{I_0 - I_1 + I_6 - I_5}{L_1 L_3} \qquad (6b)$$

$$I^2_{\Delta 23} = \frac{I_0 - I_5 + I_4 - I_3}{L_2 L_3} \quad (6c)$$

Further, one third order correction $I^3_\Delta$ compensates for the difference from plane to plane i.e.:

$$I_\Delta{}^3 = \frac{-I_0 + I_1 - I_2 + I_3 - I_4 + I_5 - I_6 + I_7}{L_1 L_2 L_3}. \quad (7)$$

Generalizing to n dimensions, $2^n$ basis images are collected, $I_0, I_1, I_2, \ldots I_{n-1}$. Intermediate interpolation increments $L_1, L_2, L_3 \ldots, L_n$ are selected along each of the n dimensions. Each of the n first order differential images $I^1_{\Delta j}$ along a corresponding one of the dimensions 1, 2, ... n is expressed as:

$$I^1_{\Delta j} = \frac{I_j - I_o}{L_{1j}}, \quad (8)$$

where j is each of the dimensions from 1 to n. Similarly, there are $(n!)/(n-m)!m!$ $m^{th}$ order difference images, where m is an arbitrary interger between 1 and n. The single nth order differential image is defined by:

$$I_\Delta{}^n = \frac{-I_0 + I_1 - I_2 + I_3 - I_4 \ldots I_{2n}}{L_1 L_2 L_3 \ldots L_n}. \quad (9)$$

Looking again to FIG. 1A, the basis images $I_0, I_1, \ldots$ may each be from any one of a plurality of medical diagnostic scanners such as a CT scanner 10, a magnetic resonance imaging apparatus 12, a PET scanner 14, a digital x-ray scanner 16, an ultrasound scanner 18, a nuclear or scintillation camera 20, or other image sources 22. The present invention will find application in conjunction with other types of images than medical diagnostic images e.g., common area or subject. For example, the basis images may be an optical image from an optical telescope, a radio astronomical image from a radio telescope, an infrared image of the same area, and a microwave image. Analogously, each of the images may come from the same imaging modality, while the imaging modality is set to produce images with different characteristics or of different regions.

Looking to the CT scanner by way of example, an x-ray tube 30 or other source of penetrating radiation directs a thin fan-shaped beam of radiation 32 through an image circle or examination region 34 to a ring of radiation detectors 36. A motor or other means 38 rotates the x-ray source around the examination region 32. In this manner, the x-ray detectors 36 measure a relative amount of radiation attenuation along the large multiplicity of paths through the examination region. A sampling means 40 samples all of the irradiated detectors 36 as short time intervals. In the preferred embodiment, the sampling means 40 sorts the received radiation into source fans, i.e. each view represents the radiation attenuation across a fan shaped array of paths which convrege at an apex at a given one of the detectors.

A multiplying means 42 multiplies the vector of data representing each view by a kernal filter function or transfer function retrieved from a kernal filter memory means 44. Various filter functions may be selected such as any one filter functions 1-N which are stored in a filter function memory means array 46. Optionally, an interpolating means 48 interpolates two or more filter functions. Each of the filter functions produces an image with pre-selected characteristics, such as smoothness, strong or enhanced edges, high resolution, and the like, as well as combinations thereof. Each filter function while emphasizing one characteristic tends to be relatively weak in another. Thus, the selective filter function is normally a compromise among the various selectable image properties. A reconstruction means 50 performs a convolution and back projection or other known reconstruction algorithm to produce an electronic image presentation.

Figure 1B:
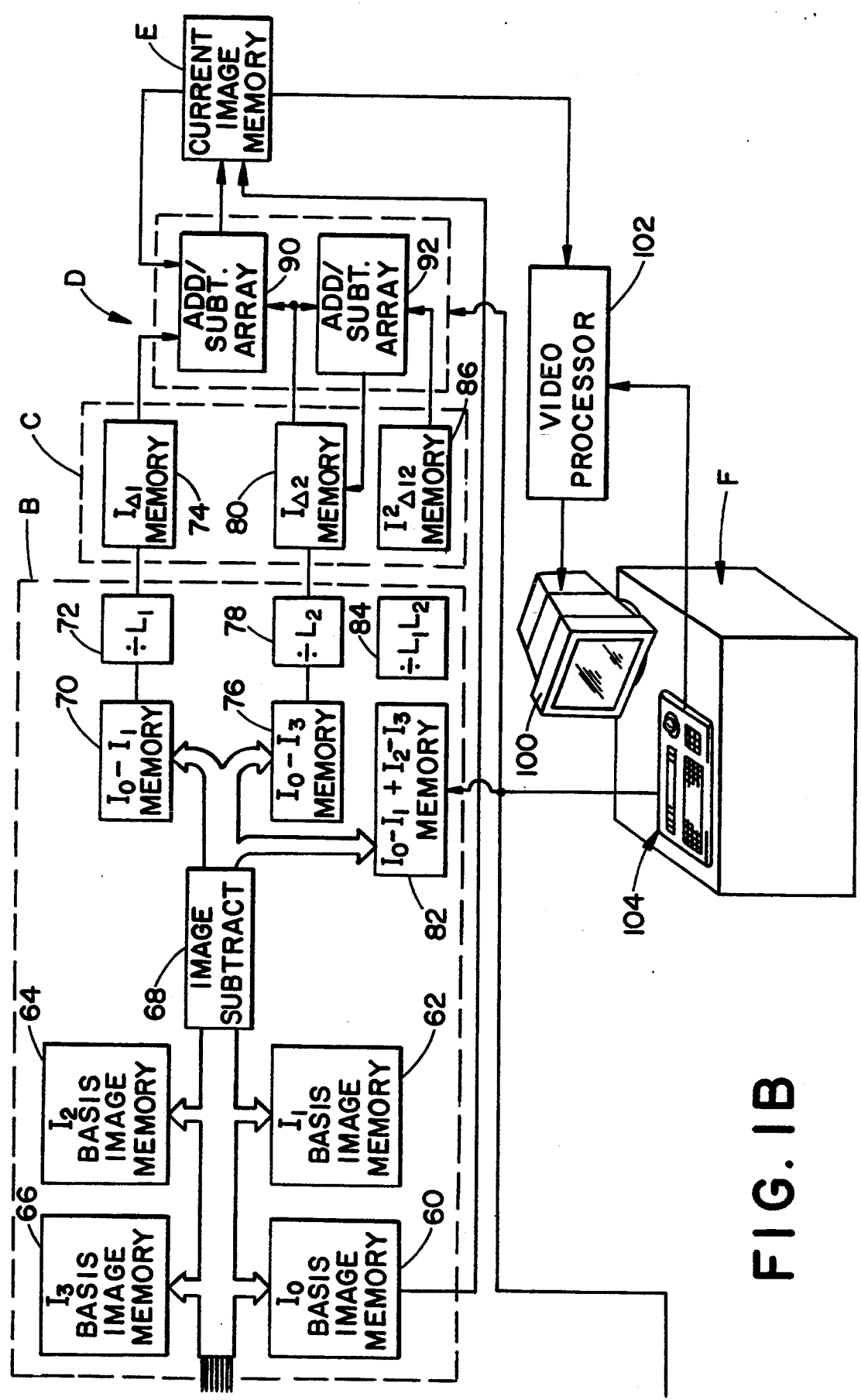

With reference to FIG. 1B, the image subtracting and manipulating means B include a memory means for temporarily holding each of the basis images. In the four image, second order embodiment, image memory means 60, 62, 64, and 66 are provided for holding the four basis images, respectively. These image memory means may be part of a disk or other mass storage media or may be distributed among the various image sources. All four images need not be held in these memories concurrently. An image subtracting means 68 subtracts the basis images as provided by equations (1)-(9) above. More specifically, to the four image embodiment, the image subtraction means 68 subtracts image $I_1$ from image memory means 62 from image $I_0$ from memory means 60 and stores the difference temporarily in a difference image memory 70. A dividing means 72 divides each pixel value of the subtracted difference image in memory 70 by the interpolation step $L_1$ along the corresponding dimension to form the first differential image $I_{\Delta 1}$ which is stored in a first differential image means 74. Analogously, this subtraction means subtracts the image $I_3$ retrieved from memory means 66 from image $I_0$ retrieved from memory means 60 and stores the result temporarily in a memory means 76. Each pixel of the image stored in memory means 76 is divided by the number of interpolation steps $L_2$ along the corresponding dimension by a dividing means 78 to produce the second difference image $I_{\Delta 2}$ which is stored in a second differential image memory means 80. Analogously, the image subtraction means 68 sums the images $I_0$ and $I_2$ and subtracts the images $I_1$ and $I_3$ to produce an image which is temporarily stored in image memory means 82 before being divided by the product of the number of available interpolation steps along the two dimensions $L_1, L_2$, by a dividing means 84. The resultant double differential image $I^2_{\Delta 12}$ is stored in a second order differential image memory means 86. Optionally, an interpolation means may be provided for increasing or decreasing the number of pixels in some of the basis images, as necessary, such that each of the images has the same number of pixels, e.g. a 512×512 or 1024×1024 image.

The adder/subtractor array means D preferably has a first adder/subtractor array means 90 which adds and subtracts the first order differential image $I_{\Delta 1}$ and $I_{\Delta 2}$ to the currently displayed image. A second adder/subtractor array means 92 adds and subtracts the second order differential image $I^2_{\Delta 12}$ to one of the first order differential images, e.g., the second differntial image $I_{\Delta 2}$. Alternately, the second order differential image may be added directly to the currently displayed image.

The terminal F includes a video display monitor 100 which converts the electronic currently displayed image representation in memory E into a man readable display. A video image processor 102 superimposes an image such as that of FIG. 2 or FIG. 3 on the image displayed on monitor 100 to assist the operator in interpolating among the basis images. A track ball assembly 104 provides a signal to the video image processor 102 to control movement of a cursor on the displayed grid. The track ball assembly 104 includes counters which cause the cursor to step in each of the horizontal and vertical direction. Each time the count equals one increment $L_1$, $L_2$, etc., in the appropriate direction, the adder array D adds or subtracts the appropriate differential or the second order or double differential image to the image representation in image memory E. Optionally, the cursor may be permitted to go beyond the grid of FIG. 2 as the adder/subtractor array continues to adjust the currently displayed image.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. An apparatus for selectively adjusting a relative weighting among a plurality of diagnostic images of a common region of a subject, which plurality of images each have different characteristics, the apparatus comprising:

an image subtraction and manipulation means for subtractively combining at least first and second received basis images both of the common region and dividing by a first plural number of available interpolation increments therebetween to define a first differential image;

a differential image memory means connected to the image subtraction and manipulation means for storing the first differential image;

a currently displayed image memory means for storing a currently displayed image which displayed image is a weighted combination of at least the first and second basis images;

a weighting adjustor controlled by an operator for selectively adjusting the relative weighting of the first and second basis images in the displayed image, including:

an image adder means connected to the differential image memory and the currently displayed image memory for selectively and repeatedly adding the first differential image from the differential image memory means to the image stored in the currently displayed image memory means to weight the displayed image more heavily toward the second basis image, and an image subtractor means connected to the differential image memory and the currently displayed image memory for selectively and repeatedly subtracting the first differential image from the image stored in the currently displayed image memory means to weight the displayed image more heavily toward the first basis image.

2. The apparatus as set forth in claim 1 wherein the first differential image and the currently displayed image each have a common pre-selected number of pixels and wherein the image adder includes an array of the same common preselected number of pixel adders, whereby each pixel of the first differential image is combined with the corresponding pixel of the currently displayed image concurrently.

3. The apparatus as set forth in claim 1 wherein: the image subtractor and manipulator further subtractively combines a third received basis image and the first basis image and divides by a second number of interpolation increments between the first and third images to create a second differential image representation; and further including:

a second differential image memory for storing the second differential image representation, the second differential image memory being connected with the image adder and the image subtractor such that the second differential image is selectively added to and subtracted from the currently displayed image.

4. The apparatus as set forth in claim 3 wherein: the image subtractor and manipulator further subtracts a sum of the first and third basis images from a sum of the second basis image and a fourth basis image and divides by a product of the first and second number of increments to define a second order differential image; and further including:

a second order differential memory for storing the second order differential image.

5. The apparatus as set forth in claim 4 further including a second order differential image combiner for selectively combining the second order differential image with one of the first and second differential images.

6. The apparatus as set forth in claim 4 further including a track ball for adjustably selecting a weighting between the first, second, third, and fourth basis images, the track ball being operatively connected with the first and second differential image memories, the image adder and the image subtractor for causing the image adder and the image subtractor to combine at least one of the first and second differential images with the currently displayed image each time the track ball is rotated sufficiently to indicate one of the first and second increments, respectively.

7. The apparatus as set forth in claim 6 further including a video image processor for displaying an interpolation grid in which an indication of the first, second, third, and fourth basis images are displayed at corners of a rectangle and the track ball causes a cursor to move thereamong.

8. The apparatus as set forth in claim 4 further including a CT scanner including:

a view sampler for sampling a plurality of views;

an array processor for multiplying the views with one of a plurality of kernal filters;

an image reconstruction processor for reconstructing the filtered views into one of the basis images; and a plurality of kernal filter memories for storing a plurality of kernal filters, such that the first, second, third and fourth basis images are generated by the CT scanner, each with a different kernal filter.

9. An apparatus for selectively blending at least two different electronic images of a common region with selectively adjustable relative weighting, the apparatus comprising:

a first memory means for storing a first electronic image of the common region having first characteristics;

a second memory means for storing a second electronic image of the common region having second characteristics;

a subtraction means connected with the first and second memory means for determining a difference between the first electronic image and the second electronic image;

a divider means for reducing a magnitude of the difference between the first and second electronic images in accordance with a first number of available interpolation steps between the first and second electronic images to create a differential image, the divider means being connected with the first memory means for replacing the first electronic image with the differential image;

an image combined means connected with the first and second memory means for selectively combining the differential image from the first memory means with an image from the second memory means to create an electronic current image which is stored in the second memory means replacing the second electronic image and any previous electronic current image such that a relative weighting of the first and second characteristics in the electronic current image is selectively adjusted;

a video monitor connected with the second memory means which converts the electronic current image into a human-readable display and which displays an indication of a relative weighting of the first and second electronic images;

a control means connected with the video monitor and the image combiner means and controlled by the operator for (i) changing the indication of the relative weighting of the first and second electronic images and (ii) controlling the image combiner means such that each time the indication changes an increment towards the first electronic image, the image combiner means subtracts the differential image from the electronic current image and each time the indication changes an increment toward the second image, the image combiner means adds the differential image to the electronic current image, whereby the human readable display changes weighting substantially in real time.

10. An apparatus for interpolating between at least first and second previously reconstructed images of a common slice of a subject, the apparatus comprising:

a first image subtractor which subtracts the first image from the second image;

an image divider which divides the subtracted first and second images by a number of available interpolation steps between the first and second images to create a differential image;

a human-readable display which displays (i) initially one of the first and second images as a currently displayed image, (ii) an icon representing the first image, (iii) an icon representing a second image, and (iv) a cursor;

an image combiner which selectively combines the differential image and the currently displayed image;

a cursor controller controlled by the operator to move the cursor on the human-readable display between the first and second image icons, the cursor controller controlling the image combiner such that each time the cursor moves one increment towards the first image icon, the image combiner subtracts the differential image from the currently displayed image and each time the cursor moves one increment toward the second image icon, the image combiner adds the differential image to the currently displayed image, whereby the currently displayed image changes substantially in real time.

11. An apparatus for selectively adjusting a relative weighting of combined images, the apparatus comprising:

an image pixel subtraction means for subtracting each pixel value of a first image from a corresponding pixel value of a second image to form a pixel value difference;

a pixel division means connected with the image pixel subtraction means for dividing each pixel value difference by a preselected plural number of available interpolation steps between the first and second images to generate pixel values of a differential image;

a differential image memory means connected with the pixel division means for storing the pixel values of the differential image;

a current image memory means for storing pixel values of a current image derived from the first and second images;

a monitor means connected with the current image memory means for converting pixel values from the current image memory means into a human-readable image;

an image processor means connected with the differential image memory means and the current image memory means for selectively adding and subtracting pixel values of the differential image with corresponding pixel values of the current image for selectively adjusting weighting the current image, hence the human-readable image, between the first and second image;

an operator control means connected with the image processor means for providing operator control of the image processor means and for providing an indication of the weighting of the current image between the first and second images, the operator control means (i) controlling the image processor means to add the differential image pixel values to the current image pixel values such that the human-readable image is more heavily weighted toward the second image and changing the indication to reflect a heavier weighting of the second image and (ii) controlling the image processor means to subtract the differential image pixel values from the current image pixel values such that the human-readable image is more heavily weighted toward the first image and changing the indication to reflect a heavier weighting of the first image.

12. An apparatus for interpolating images of a common region, the method comprising:

a differential image memory means for storing a differential image determined by subtracting a first basis image from a second basis image and dividing by a first plural number of available interpolation steps;

a monitor means for converting an electronic current image into a human-readable image;

an updatable current image memory means connected with the monitor means for storing the electronic current image;

a video processor means connected with the differential image memory means and the updatable current image memory means for selectively and repeatedly updating the current image stored in the current image memory means by (i) selectively and repeatedly adding the differential image to weight the human-readable image more heavily toward the second basis image and (ii) selectively and repeatedly subtracting the differential image to weight the human-readable image more heavily toward the first basis image;

a control means connected with the video processor means and controlled by the operator for selectively causing the video processor means under operator control (i) to add the differential image to the current image in the updatable current image memory means such that the human-readable image is more heavily weighted toward the second basis image and (ii) to subtract the differential image from the current image such that the human-readable image is more heavily weighted toward the first basis image.

13. An apparatus for interpolating at least first and second electronic images of a common region, the second electronic image having different characteristics from the first electronic image, the apparatus comprising:

a first image memory means for storing an image, the first electronic image being initially stored in the first image memory means;

a second image memory means for storing an image, the second electronic image being initially stored in the second image memory;

an image subtracting means connected with the first and second image memory means for determining a difference between the first image stored in the first image memory means and the second image stored in the second memory means to produce a difference image and a pixel divider means connected with the image subtracting means for reducing a magnitude of each pixel value of the difference image in accordance with a preselected plural number of available interpolation steps to create a differential image, the pixel divider means being connected with the second image memory means to store the differential image in the second memory means;

an image processor means connected with the first and second image memory means for selectively additively and subtractively combining the differential image from the second image memory means with the image in the first image memory means;

a display means for converting the image in the first image memory means to a human-readable display;

a control means connected with the image processor means and controlled by the operator for selectively controlling the image processor means for (i) additively combining the differential image from the second image memory means with the image in first image memory means to increase a weighting the second electronic image and decreased weighting of the first electronic image in the human-readable display and (ii) subtractively combining the differential image from the second memory means with the image in the first image memory means to increase the weighting of the first electronic image and decrease the weighting of the second electronic image in the human-readable display.

* * * * *